United States Patent [19]
Martin-Neira et al.

[11] Patent Number: 6,057,799
[45] Date of Patent: May 2, 2000

[54] INTERFEROMETRIC HYPERFREQUENCY RADIOMETRY SYSTEM WITH MECHANICAL SCANNING

[75] Inventors: Manuel Martin-Neira, Oegstgeest, Netherlands; Joan Font-Rossello, Palma De Mallorca, Spain

[73] Assignee: Agence Spatiale Europeene, Paris, France

[21] Appl. No.: 09/249,136

[22] Filed: Feb. 12, 1999

[30] Foreign Application Priority Data

Feb. 18, 1998 [FR] France ................................. 98 02054

[51] Int. Cl.[7] ....................................................... G01S 1/02
[52] U.S. Cl. ............................................................. 342/351
[58] Field of Search ..................................... 342/351, 424, 342/425

[56] References Cited

U.S. PATENT DOCUMENTS

| | | |
|---|---|---|
| 4,864,309 | 9/1989 | Wiley et al. . |
| 4,978,962 | 12/1990 | Hisada et al. ............................ 342/351 |
| 5,724,044 | 3/1998 | Tanaka ..................................... 342/351 |

FOREIGN PATENT DOCUMENTS 40 30 365  5/1991  Germany .

OTHER PUBLICATIONS

I.V. Cherny, et al., International Geoscience and Remote Sensing Symposium Remote Sensing for a Sustainable Future, vol. 1, pp. 360–362, "Absolute in Flight Calibration of Airborne Multichannel MM–Wave Imaging Radiometer", May 28, 1996.

R. Meneghini, et al., Spaceborne Weather Report, pp. 88–94, "3.3: Scanning Modes", 1990.

C.S. Ruf, et al., IEEE Transactions on Geoscience and Remote Sensing, vol. 26, No. 5, pp. 597–611, "Interferometric Synthetic Aperture Microwave Radiometry for the Remote Sensing of the Earth", Sep. 1, 1988.

*Primary Examiner*—Mark Hellner
*Attorney, Agent, or Firm*—Oblon, Spivak, McClelland, Maier & Neustadt, P.C.

[57] ABSTRACT

The invention concerns an interferometric hyperfrequency radiometry system comprising an antenna being subject to a rotation movement around the vertical direction, with a boresight axis forming an angle with a nadir direction so as to obtain a conical scanning. The antenna is a planar array antenna, of an interferometric type with distributed elements, such that the instantaneous field of vision consists of pixels, along at least one axis perpendicular to the conical scanning for an unidimensional interferometric antenna, and along two axes for a bidimensional interferometric antenna. The elements of the interferometric antenna furthermore are connected into sub-arrays.

14 Claims, 6 Drawing Sheets

INTERFEROMETRIC HYPERFREQUENCY RADIOMETRY SYSTEM WITH MECHANICAL SCANNING

FIELD OF THE INVENTION

The present invention relates to an interferometric hyperfrequency radiometry system with a mechanical scanning and, more particularly, to such a system being aboard a satellite orbiting around the earth globe and used for observing the earth globe surface.

BACKGROUND ART

There is a large number of applications which require an imaging or mapping system. In a non exhaustive manner, the aerospace, meteorology, oceanography and astronomy applications can be quoted.

These systems must offer high performances under many aspects, which leads to requirements which, even if not contradictory, often are hard to conciliate.

It is often desirable to simultaneously obtain a large space resolution, a high sensitivity, a wide exploration zone, a short revisit time, and a continuous coverage, while keeping a reasonable degree of electric, but mostly mechanical, complexity. The underlying reason for the difficulty in obtaining these characteristics is that a radiometer can not synthesize a radiating aperture while using the orbital movement to observe the thermal radiation of the earth globe, which are comprised in a broad frequency range. This fact limits the space resolution obtainable by a radiometric system to the beam width of a radiating aperture which is no larger than the physical extension of its antenna.

A promising concept for obtaining the optimal possible performances in hyperfrequency radiometry, consists of combining a conical scanning and a "pushbroom" with the help of several beams.

Among the systems known in the art, the following, non limiting, examples, can be quoted: the "MIMR" or Multi-frequency Imaging Microwave Radiometer and the "EFAM" or Extreme Floods Alarm Mission.

The first project is described in the article of R. BORDI et al.: "MIMR Radiometer: Design, Calibration and expected Performance", "Microrad Conference", 1994.

The "MIMR" uses a combination of a conical scanning and a pushbroom in two high frequency channels, namely 36.5 and 89 GHz. The pushbroom beams are generated by means of two parallel antenna power supply sources, and the receiving systems share a single main reflector. The beam rotation results from a mechanical rotation movement of the instrument, in its entirety. In order to obtain a continuous coverage from an orbit of a particular altitude, the sensor needs to rotate at a predetermined speed.

More precisely, for a 50 degrees incident angle and when using a 1.5 m antenna radiating aperture, the ground space resolution respectively is 12 km and 4.5 km for the 36.5 Hz and 89 GHz channels. The instrument is on a 800 km orbit. Two beams are provided in the 36.5 GHz channel and four beams in the 89 GHz channel.

The second project is described in the article of Pierdicca and al.: "Observing Storm Clouds by spaceborne Multifrequency Microwave Radiometers", "ESA Earth Observation Quarterly", No 49, 1995. This example is particularly interesting since it concerns a radiometer application to meteorology and, more particularly, to the observation of clouds and rain precipitation. The interest resides in that the space resolution should be high and the revisit time should be short, for this application. These requirements are difficult to meet since this type of mission is based on small satellite configurations. The antenna size thus also is limited, 1 m at most, which results in a ground level space resolution of 10 km at 36.5 GHz and 20 km at 89 GHz, from a 600 km orbit. A 30 rpm rotation speed needs to be communicated. An exploration zone of 1000 km is reached for one single satellite. There follows that several satellites, typically four to six satellites, are required to obtain a short revisit time.

The present tendencies can be summarized as follows: in correlation with more stringent requirements for space resolution, an endless spiraling evolution towards a growing mechanical complexity is observed, for the reasons described hereafter.

Namely, the higher the space resolution is, the larger the antenna size, and the faster the radiometer rotation speed, must be in order to obtain a continuous coverage. There follows that the integration time available per pixel decreases, which in its turn degrades the sensitivity. The sensibility may of course be restored by providing additional "pushbroom" beams, which allows reverting to the original rotation speed. This beam addition however in its turn causes a larger antenna size due to the larger angular range required by the clearance of the beams, each of which illuminates an effectively different reflector zone. The finally obtained configuration implies a large size reflector, because of the increased space resolution and the added scanning beams. This configuration also includes a larger number of receivers, also due to the added beams, which rotate at the original speed. The feasibility of this mechanical configuration is very questionable since it is well known that the moment of inertia, and consequently the couple, of the instrument increases exponentially with the reflector size and linearly with its mass.

SUMMARY OF THE INVENTION

The object of the invention is to break the above noted "spiraling" mechanical complexity, and to overcome the difficulties met in the hyperfrequency radiometry field of the prior art.

The invention namely allows reaching both a high space resolution and a low rotation speed, while meeting both requirements of sensitivity and exploration zone width.

For this purpose, the radiometry system of the invention combines three technical characteristics:

a conical beam scanning of a mechanical type;

an interferometry technology; and the use of antennas arranged in sub-arrays.

These technologies interact with one another so that the invention may reach its targets.

The invention consequently comprises an interferometric hyperfrequency radiometry system comprising an antenna supported by a satellite, which orbits around the earth globe and is designed for projecting an exploration beam of a determined earth globe surface zone, characterized in that said antenna is subject to a rotation movement around a so-called nadir axis forming a determined angle with a so-called boresight direction so as to obtain a conical scanning around the nadir direction and so that the impact of said beam effects a cycloid movement the symmetry axis of which coincides with the track of the orbital movement of said satellite on the earth globe surface, in that said antenna is an array antenna of an interferometric type such that the instantaneous field of vision consists of elementary contiguous zones, called pixels, along at least one axis perpendicular to said conical scanning and in that said interferometric antenna consists of discrete elements connected in sub-arrays.

BRIEF DESCRIPTION OF THE FIGURES

The invention will be better understood and further characteristics and advantages of the same will appear upon reading the following description while referring to the appended drawings in which.

DETAILED DESCRIPTION OF THE FIGURES

Figure 1:
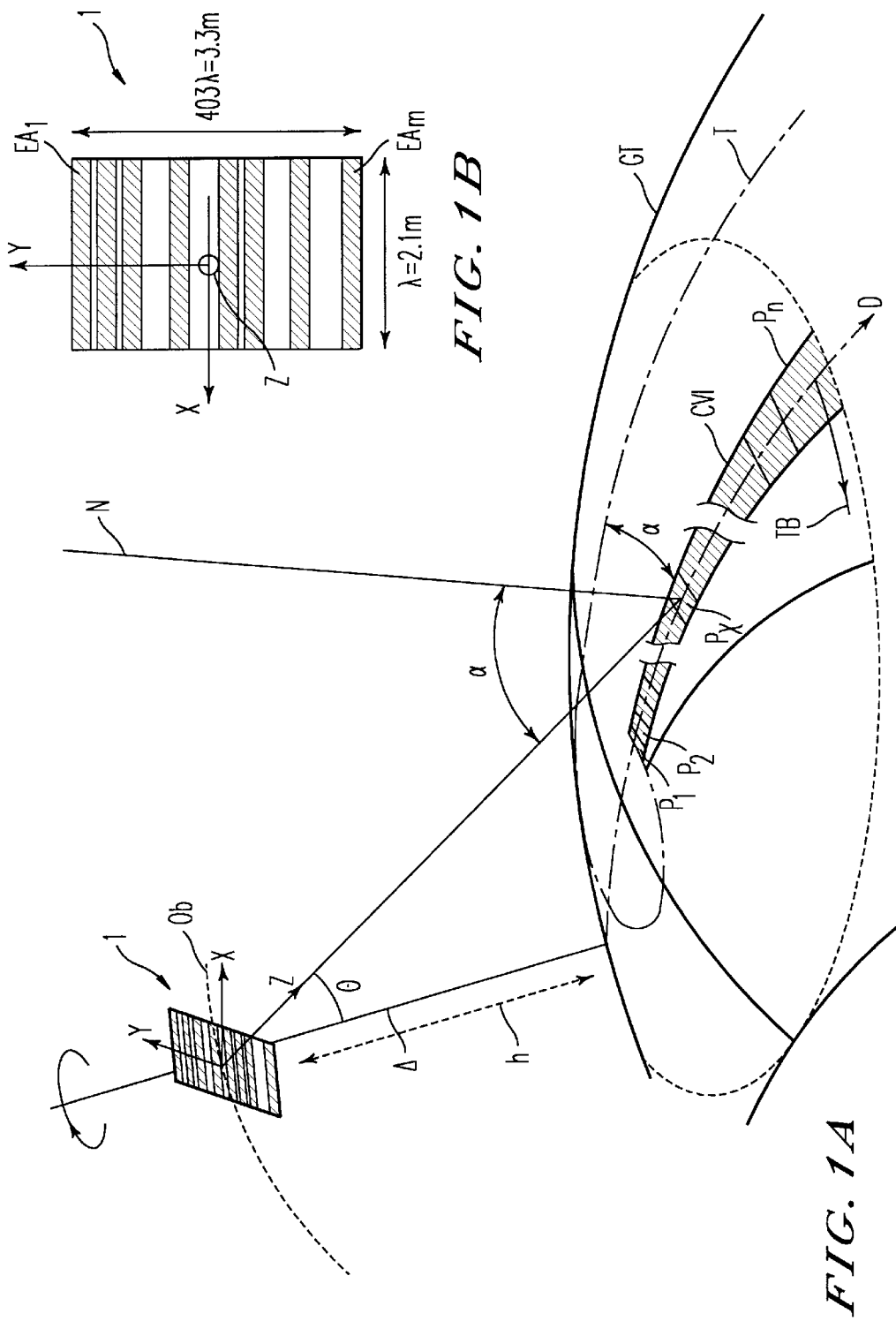
FIGS. 1a and 1b schematically illustrate the operation of the radiometry system of the invention with an unidimensional interferometric antenna.

The major characteristics of the invention will now be detailed. As previously indicated, the interferometric hyperfrequency radiometry system of the invention exploits and combines the three following technologies:

a conical beam scanning of a mechanical type;

an interferometry technology; and the use of antennas arranged in sub-arrays.

Due to the interactions of this combination, these technologies interact with one another in such a way that the advantages associated with each of them counterbalance the inconveniences of the other two implemented technologies.

In the first place, the conical scanning of a mechanical type allows obtaining a large exploration zone width, or swath.

As previously indicated, obtaining a large space resolution would require using a large size antenna. This in turn would require compensating the moments, which implies a large degree of mechanical complexity to obtain a rotation movement for a large size antenna.

To overcome this inconvenience, the invention according to a second main characteristic implements an interferometry technology, which allows a low rotation speed while keeping good space resolution performances.

An interferometer allows synthesizing small size pixels within the exploration zone. These pixels are defined as the region projected on the earth globe GT surface of the beam width at −3 dB of the synthesized equivalent antenna.

For this purpose, a planar antenna with distributed elements is advantageously used. The fact for an interferometer antenna of being planar offers definite advantages as compared with a reflector type antenna, supplied by radiant energy sources.

The interferometry technologies however themselves suffer from some inconveniences. The main inconvenience results from the needs of both a phase coherent operation and a processing of the interferometric signal. Furthermore, a millimeter wave interferometer, as in this case, suffers from two major following limitations:

In the first place, the exploration zone is limited by the decorrelation effects, i.e. the decorrelation caused by the pass-range of the sensors and their size. The larger those parameters are, and also the better the sensitivity is, the narrower the observation zone is. This undesirable effect is overcome by the above-noted mechanical scanning, which, for the interferometer, authorizes an exploration zone smaller than the exploration zone required for a given application.

In the second place, both unidimensional type and bidimensional type interferometers exist. Both of these interferometer types must have appropriately spaced antenna elements in order to avoid the so-called alias or interference effects of the image folding. The spacing typically is $0.5\lambda$ in the case of an unidimensional interferometer and $0.58\lambda$ in the case of a bidimensional interferometer, with $\lambda$ being the used wavelength. Obtaining a good antenna filling factor also is required, which filling factor must be compatible with the requested sensitivity. In the case of a millimeter wave, this leads to a large number of receivers and a very large number of correlators. The invention solves this inconvenience by using dispersed antenna elements arrays, i.e. by implementing sub-arrays.

The invention namely, according to a third main characteristic, implements the sub-array technology. This technology refers to combining several elements of an array to constitute a combined element such that two successive combined elements are spaced by a distance smaller than their length. In the case of an interferometer, this arrangement allows sampling the field with a spacing smaller than the size of the combined elements which effects a double impact as indicated below:

On the one hand, larger and more directive elements can be realized, in order to improve the filling factor of the interferometric distributed antenna, without modifying the spacing between combined elements.

On the other hand, spacings larger than the maximum allowable for operating in the foldless conditions can be used, provided however that the illumination and the form of the combined directing elements and the spacing are appropriately selected. Operating in very small folding conditions is made possible by using a uniform illumination of hexagonal radiating apertures in bidimensional interferometry. The equivalent, in unidimensional interferometry, consists of a uniform illumination of a rectangular radiating aperture.

An interferometric hyperfrequency radiometry system of the invention provided with the just reminded major characteristics will now be described with reference to FIGS. 1a and 1b.

It must be appreciated that the interferometric hyperfrequency radiometry system of the invention may just as well include a unidimensional type interferometer or a bidimensional type interferometer, with the first type however being of a lesser complexity. To illustrate these possibilities, a radiometry system incorporating an interferometer of the first, i.e. unidimensional, type will now be considered.

As indicated above, a uniformly illuminated rectangular radiating aperture is advantageously used in this case. The interferometric antenna 1 is mechanically rotated, so as to obtain a conical scanning around the rotation axis $\Delta$, which coincides with the nadir direction under the antenna 1. In FIG. 1a, the antenna 1 is arranged in a plane XY slanted with respect to the nadir direction ($\Delta$ axis). The axis Z, which forms an orthonormation axis system with the two previous XY axes, constitutes the boresight. When the antenna 1 is rotated around the nadir direction, i.e. around the $\Delta$ axis, the boresight Z describes a cone with a vertex half angle $\theta$. The instantaneous field of vision CVI extends along a direction D perpendicular to the track TB of the scanning on the earth globe GT surface. The scanning angle γ represents the angle which the direction D and the track T form, at a given instant of a conical scanning of a beam, on the earth globe GT of the movement of the satellite supporting the antenna 1.

The instantaneous field of vision CVI corresponds to the beam width for each antenna element which advantageously consists of a uniformly illuminated elongated rectangular radiating aperture.

FIG. 1b schematically illustrates a planar antenna 1 for an unidimensional interferometry. It includes m antenna elements, $EA_1$–$EA_m$ consisting of rectangular apertures distributed along the Y axis.

The major side of each antenna element, $EA_1$–$EA_m$, is orientated perpendicularly to the site plane YZ, which allows obtaining the required space resolution along the scanning direction TB (azimuth) due to its physical size. The space resolution along a direction D (site) perpendicular to the scanning track TB is obtained by interferometry, according to one of the major characteristic of invention, and several pixels p1–pn can simultaneously be synthesized inside the instantaneous field of vision CVI.

The elements $EA_1$–$EA_m$ of the interferometric antenna 1 may be uniformly distributed, which implies a large number of elements. It is possible to optimize the number of the antenna elements i.e. by distributing them while keeping all base lines required for obtaining the synthesis processing of radiating aperture. The antenna elements $EA_1$–$EA_m$ for this purpose are located along the Y axis in "strategic" locations, depending upon the used wave length λ. This technology is known per se and a detailed information can be obtained by referring to the article of C. S. Ruf entitled: "Numerical Annealing of Low-Redundancy Linear Arrays" "IGARSS" 93, 1993. This technology allows strongly reducing the redundancy, and consequently the number, of the antenna elements. An antenna of this type will be illustrated hereafter, with reference to FIG. 3.

The filling factor is kept sufficiently high by arranging the antenna elements $EA_1$–$EA_m$ into sub-arrays. This arrangement which conforms with another major characteristic of the invention allows meeting a temperature sensitivity requirement, typically of the order of 0.5 to 1° K. Arranging the antenna 1 into sub-arrays implies using signal amplifiers and combinators at several positions in order to form the combined elements.

Figure 2:
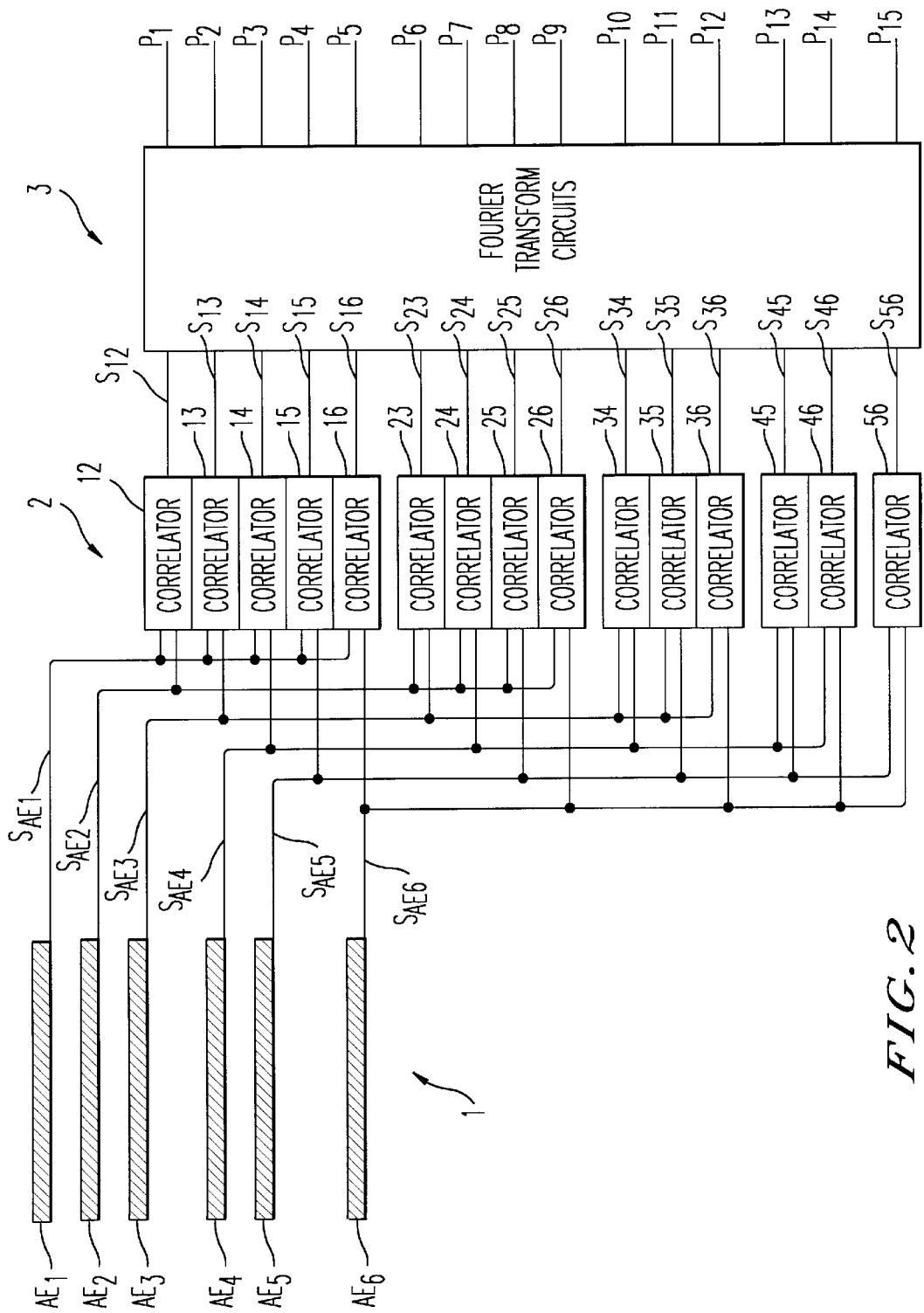
FIG. 2 is a block diagram showing the main electric interconnections of the system of FIGS. 1a and 1b.

FIG. 2 schematically illustrates as a block diagram the configuration of both the antenna 1, in sub-arrays, and the associated electronic circuits. As a help to the present explanation, it was supposed, for purpose of simplification, that the antenna 1 only includes six antenna elements, referenced $AE_1$–$AE_6$. These antenna elements are grouped into sub-arrays and the output signals $S_{AE1}$–$S_{AE6}$ are selectively distributed to a series of correlators 2, arranged in five groups (in the described example): 12 to 14, 23 to 26, 34 to 36, 45 to 46 and 56, which consequently respectively comprise from up to five correlators down to one single correlator. In the illustrated example, the signal $S_{AE1}$ of the first antenna element $AE_1$ is transmitted to all correlators of the first group: 12 to 16, the signal $S_{AE2}$ of the second antenna element $AE_2$ is transmitted to the correlator 12 and to all correlators of the second group 23 to 26, the signal $S_{AE3}$ of the third antenna element $AE_3$ is transmitted to the correlators 13, 23 and to all correlators of the third group 34 to 36, the signal $S_{AE4}$ of the fourth antenna element $AE_4$ is transmitted to the correlators 14, 24, 34 and to all correlators of the fourth group 45 and 46, the signal $S_{AE5}$ of the fifth antenna element $AE_5$ is transmitted to the correlators 15, 25, 35, 45 and to the single correlator 56 of the fifth group, and the signal $S_{AE6}$ of the sixth antenna element $AE_6$ is transmitted to the correlators 16, 26, 36, 46 and 56.

The output signals of these different correlators 2 are transmitted to Fourier Transform circuits 3 which deliver the signals representing the image pixels, fifteen pixels p1–p15 here, which constitute the instantaneous field of vision CVI (FIG. 1a).

Depending upon the application type, two objectives, which turn out to be diverging, may be fixed: a minimal mechanical complexity or a minimal complexity of the electronic circuits.

The mechanical complexity essentially depends upon the rotation speed of the interferometric hyperfrequency radiometry system, i.e. also of the antenna 1. A minimal mechanical complexity can thus be achieved when the rotation speed is low, which in its turn is made possible when the system is within the alias-free operating conditions. This is possible when the antenna element spacing typically equals 0.5λ. The size of the antenna element on site advantageously is selected to be the minimal size for which the filling factor of the distributed array is compatible with the required sensitivity. As a help to the present explanation and as an example, antenna elements of a 2λ length are appropriate to obtain a conversion into appropriate filling factors, higher than 20%.

The relatively small antenna element size on site provides a large instantaneous field of vision along the direction D and authorizes a relatively low rotation speed. On the other hand, the small element spacing implies a large number of receivers and correlators, contrarily to the embodiment which now will be described immediately below.

Namely, if a minimal complexity for the electronic circuits, i. e. a minimal number of receivers and correlators, is desired, it is necessary to operate under conditions of small folding, which is obtained when the spacing between the elements of the antenna 1 is larger than 0.5λ. In this case, folding images come to be interposed into the field of vision of the antenna 1. In order to calculate the perturbing folding level inside the instantaneous field of vision CVI, the height h of the orbit Ob followed by the (non represented) satellite bearing the antenna 1 (i.e. the distance between the antenna 1 and the projection (or track) T of this orbit Ob on the earth globe (GT) as well as the slanting angle of the plane XY of the antenna 1 should both be taken into account. Namely, only the image folding of the earth disk should be considered. The cold sky is at a very low, known and constant temperature (2.7° K.), which consequently is very easy to correct. A uniformly illuminated radiating aperture has the property of presenting zeros at all folding centers, which results in the presence of a low folding region around the boresight direction Z. The relative size of the angular range for small folding, as compared to an instantaneous field of vision CVI (i.e. the beam width of the antenna elements) increases proportionally to the ratio of the small size of the antenna elements, $EA_1$–$EA_m$, to the minimal spacing between those. Typically, a ratio of four to one between the height and the element spacing leads to a folding level lower than −20 dB on the major part of the instantaneous field of vision CVI. The folding region is the effective part of the instantaneous field of vision CVI for which the pixels $p_1$–$p_n$ (FIG. 1a) can be synthesized with the required radiometry precision.

An important spacing between antenna elements, $EA_1$–$A_m$ directly leads to a smaller number of receivers and correlators. Both the high element directivity and the presence of a folding decrease the usable part of the instantaneous field of vision CVI (perpendicularly to the scanning) and require a higher rotation speed than in the previously described embodiment.

What was just made explicit for a unidimensional interferometry antenna also applies to an bidimensional interferometric antenna.

As a help to the present explanation, an example of a practical realization of an interferometric hyperfrequency radiometry system according to the invention, applicable to rain mapping, will now be described.

The 800 km orbit level h was selected to obtain the largest possible exploration zone and consequently also the shortest possible revisit time. Two frequencies 36.5 and 89 GHz and a polarization of the single beam were selected. Only the characteristics obtained with the low frequency, i.e. 36.5 GHz, will be detailed hereafter.

The incident angle α between the normal to the earth globe GT surface and the beam slant, between the pixel p1 and the pixel $p_n$, varies in the described example between a minimum of 25 degrees and a maximum of 56 degrees, with the angle θ between the axis Z and the normal N, at the impact point of the axis Z, being selected to equal 34.84 degrees.

The resolution target is 5 km, along the D and TB directions, for a 50 degrees incident angle.

The equations governing the interferometry antennas of a linear planar type with dispersed elements allow deriving the sizes of the elements $EA_1$–$EA_m$ of the antenna 1, their number and their location along the Y axis, based upon the 800 km height orbit and the desired space resolution of 5 km according both previously mentioned directions. In such conditions, supposing that a Hamming window of the progressive transition type is selected in both directions in order to obtain a high beam efficiency, the global dimensions of the antenna 1 are equal to 3.3 m, along the Y axis (i.e. $L_y$=403λ, for the dimension along the Y axis, as expressed in wavelengths) and 2.1 m (206λ) along the X axis (or $L_x$=403λ, for the dimension along X expressed in wavelengths), as illustrated on FIG. 1b.

Figure 3:
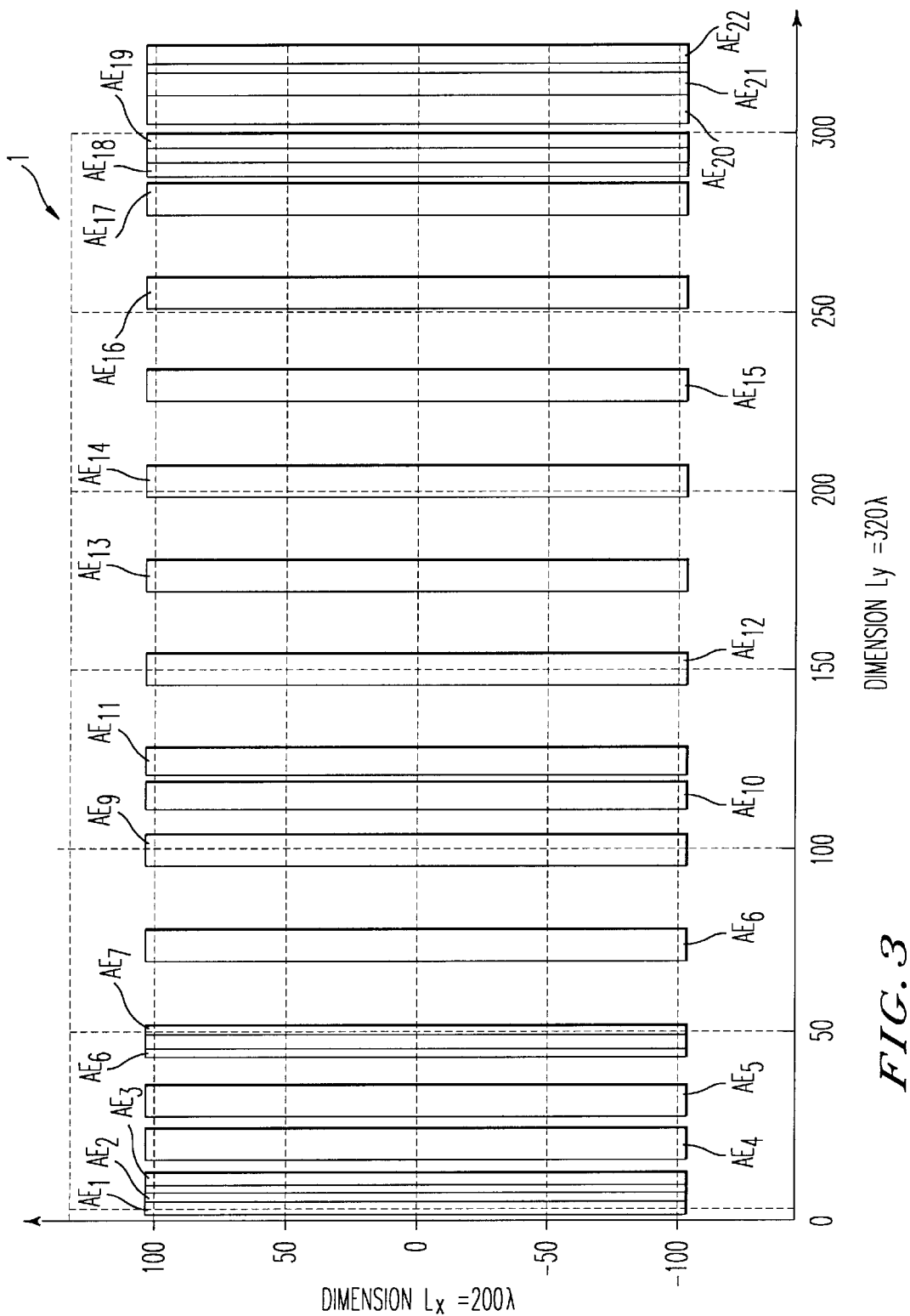
FIG. 3 schematically illustrates an example of an embodiment of an unidimensional interferometric antenna.

An example of a practical embodiment of the planar antenna 1 with dispersed elements is illustrated in FIG. 3. The physical dimensions of the antenna are as just reminded ones and it includes 22 elements. For all antenna elements, $AE_1$–$AE_{22}$ the rectangular shape is identical and the dimensions are the same: 206λ along the X axis (on both sides of a zero origin corresponding to the axis Z: FIGS. 1a and 1b), and 2λ along the Y axis. One can however ascertain that, on the one hand, the elements $AE_1$–$AE_{22}$ are non uniformly distributed and, on the other hand, that some elements are bridging one another: the elements $AE_1$–$AE_3$, $AE_6$ and $AE_7$, $AE_{18}$ and $AE_{19}$, as well as $AE_{21}$ and $AE_{22}$. The exact distribution along the Y axis is obtained by calculations, which calculations can be automated by implementing specialized antenna calculation programs. The target to be achieved consists of minimizing the redundancy (number of antenna elements) while obtaining both a correct operation and the technical characteristics reminded above.

Figure 4:
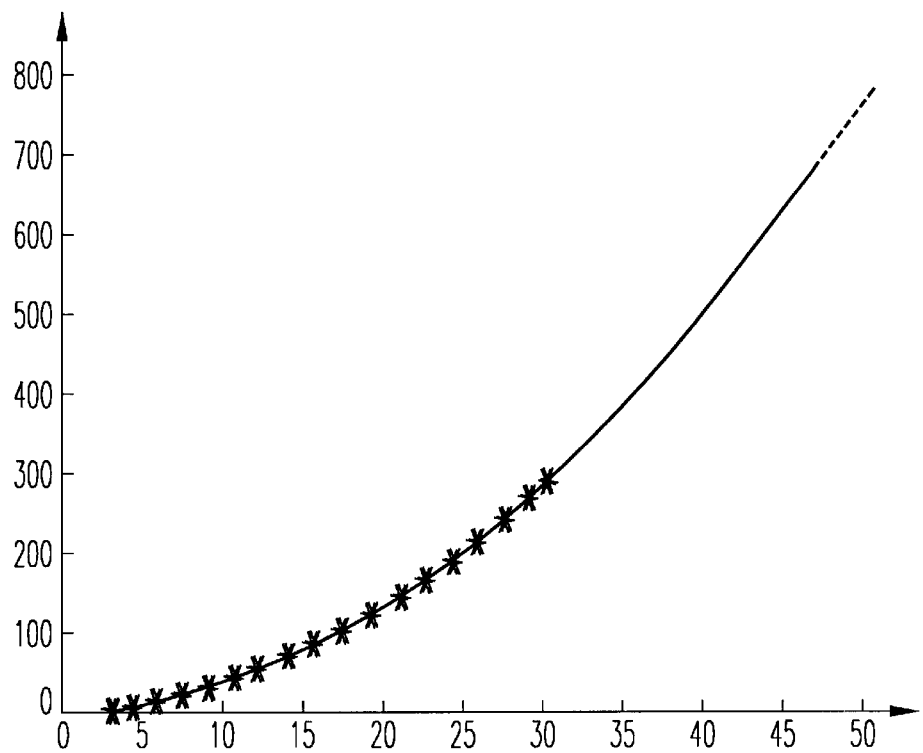
FIG. 4 is a graph showing the number of receivers required as a function of the maximal base line.

The interferometry is obtained on site and the criterion of a minimal mechanical complexity is applied. The maximal length of the base line on site is 403λ, which allows 806 sampling points in a space frequency range with a 0.5λ spacing. An extrapolation of FIG. 4, which gives the number of receivers as a function of the maximal base line (806 sampling points), indicates that this maximal base line may be realized with 51 receivers. The FIG. 4 is extracted from the above quoted article from C. S. Ruf. By adopting a small degree of bridging all along (Y axis) the array formed by the elements, the filling factor may be estimated as 51/806= 0.063 time the dimension of the antenna element on site, as expressed in spacing units. In order to obtain a filling factor higher than 20%, a ratio of four to one between the element dimension and the spacing was selected. The element dimension on site becomes 2λ and the filling factor about 25%.

The beam width of the antenna element site plane corresponds to a uniformly illuminated aperture, of a 2λ dimension, which corresponds to 25.5 degrees for −3 dB. The space resolution for incident angles lower than 50 degrees is better than 5 km, as shown on FIGS. 5 and 6. Those figures respectively illustrate, as a function of the incident angle α, the space resolution evolution along both directions D (perpendicular to the scanning) and TB (parallel to the scanning).

Figure 5:
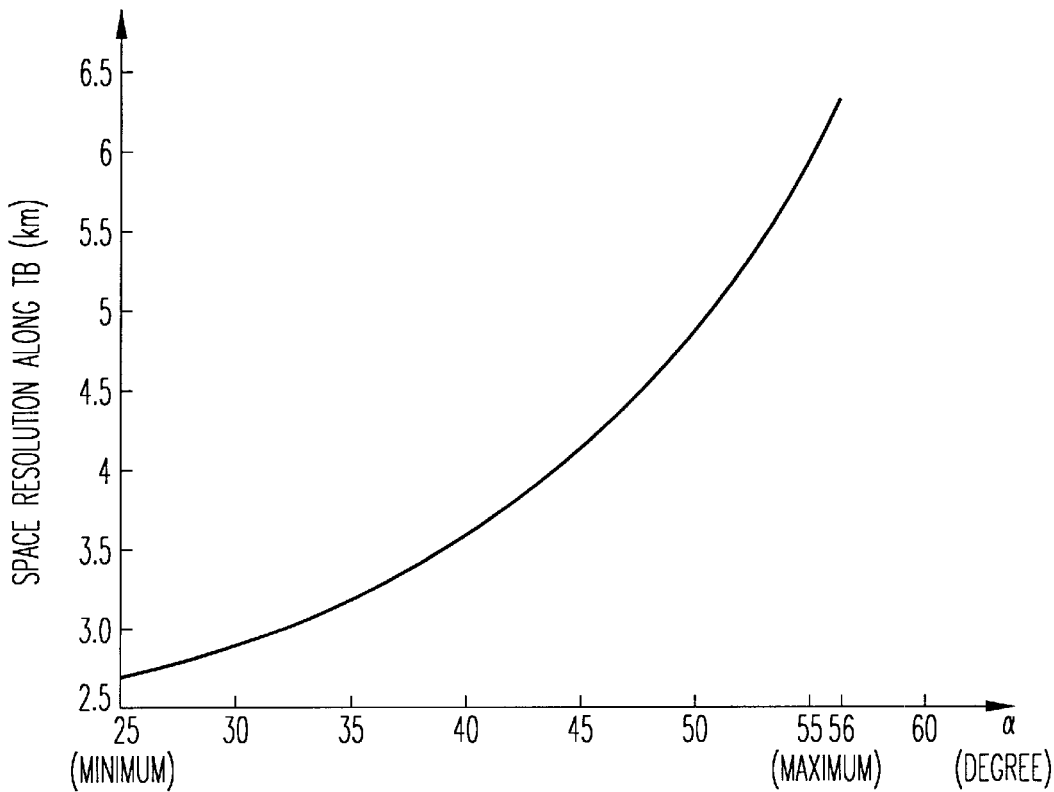
FIGS. 5 and 6 show the obtained space resolution along the scanning direction and along a direction perpendicular to the latter, respectively, as a function of the incident beam angle on the earth globe surface.
Figure 6:
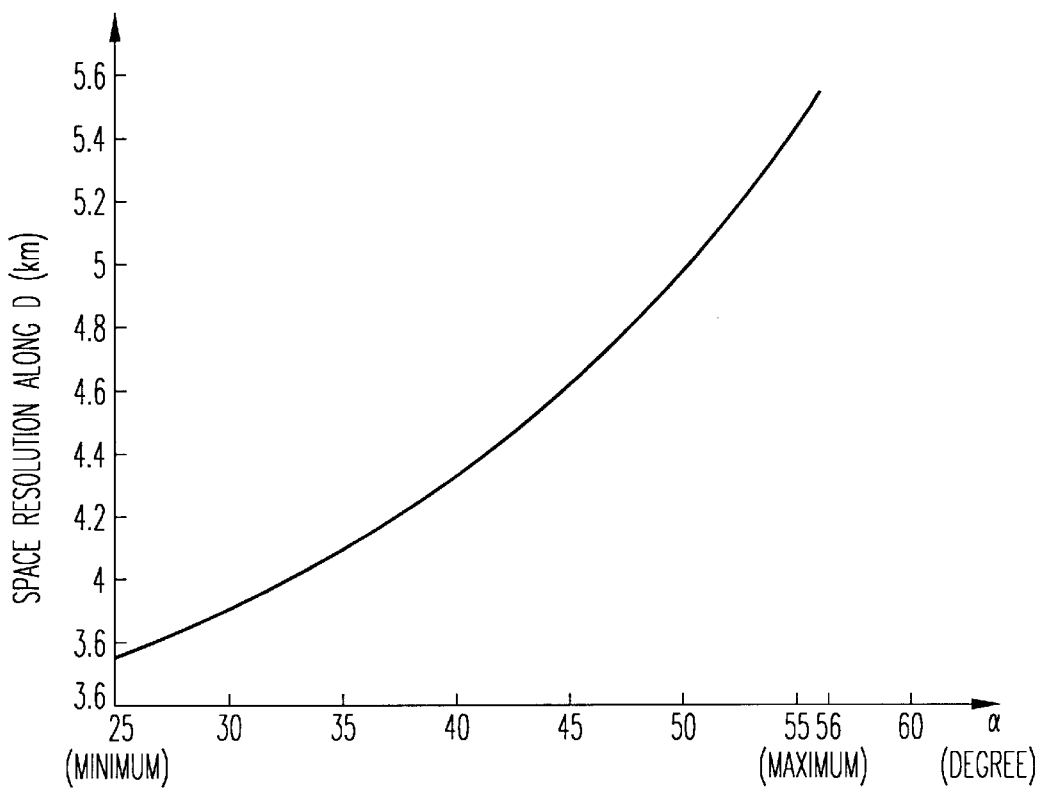

The dimension of the instantaneous field of vision CVI on site, as measured on the earth globe GT surface, is equal to 625 km, approximately corresponding to 143 pixels (n 143), the space resolution of which varies from 2.6 km for a minimal incidence (25 degrees) to 6.4 km for a maximal incidence (56 degrees) as shown on FIG. 5. The dimension of the instantaneous field of vision CVI in azimuth coincides with the space resolution along that direction. As shown on FIG. 6, it is comprised in a range extending from 3.7 km for the minimal incidence to 5.5 km for the maximal incidence.

Figure 7:
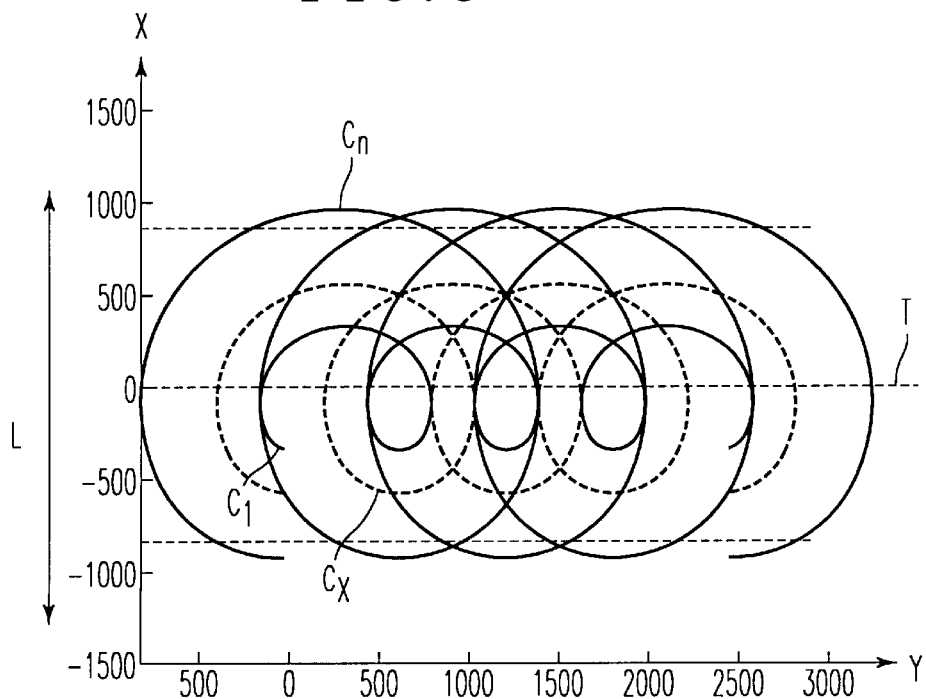
FIG. 7 illustrates a cycloid movement of the beam impact on the earth globe surface.

Since the boresight direction (Z axis) forms about a 40 degrees angle α with the normal N to the earth globe GT surface, the XY plane of the antenna 1 is slanted such that the nadir (Δ axis) and the boresight direction (Z axis) form a 34.8 degrees angle θ. When the antenna 1 is rotated along the direction of the nadir (Δaxis), the instantaneous field of vision CVI scans the surface of the earth globe GT. The FIG. 7 illustrates this composite cycloid scanning movement. The rotation of the antenna 1 around the Δ axis is namely superposed with the projection of the orbital movement of the latter. More precisely, the curves $C_1$, $C_x$ (intermediate curve in dashed lines) and $C_n$ illustrate the movements of the pixels $p_1$, $p_x$ (intersection with the Z axis) and $p_n$, respectively, on the earth globe GT surface, i.e. with the incident angles α: 25, 40 and 56 degrees. In this FIG. 7, it easily is ascertainable that, when the projection of the movement of the antenna 1 on the earth globe GT surface (on track T) has covered 625 km (in the described example), it is necessary for the antenna to have made a complete revolution around itself to obtain a continuous coverage, which determines the rotation speed or equivalently the rotation period. In the practical example described here, this rotation period is 93 s. The useful width L of the exploration zone is about 1800 km, i.e. ±900 k on either side of the coordinate X=0 (along the direction TB). The equivalent rotation speed is 0.64 rpm. This rotation speed is low enough to allow using a satellite rotating with an inertial compensation flywheel. This means that there is no need to resort to rotating members (rotating joints, and so on) in the instrument, or that there also is no need for the antenna 1 to be rotating with respect to the (non represented) satellite, which represents a substantial advantage.

The integration time for the pixel Px (along the boresight direction: Z axis) is 112 ms. Supposing that the system noise temperature (from the observed scene as well as from the receivers) is 800° K., and that the radiometric sensitivity should be 0.7° K., a 183 MHz pass-band is necessary when the filling factor value (about 0.25) is taken into account.

The number of the needed complex correlators equals the number of sampling points (806 points) which corresponds in real terms to a doubled number of correlators (real and imaginary parts) i.e. 1612 correlators. There follows that the product "pass-band x correlator number", giving the degree of electric complexity, is 295 GHz.

In a practical manner, the antenna 1 can be realized as a slit type wave guide array. In order to obtain a sufficient pass-band and an insensitivity to the manufacturing tolerance errors, the wave guide supply array for each sub-array must consist of a resonant structure. For instance, each 206λ×2λ sub-array may consist of three to four guides piled on site, with each of them having four sections in azimuth. The estimated mass of such an antenna is about 30 kg, excluding the deploying mechanism, the receivers and the associated radio frequency electronics. The electric losses are estimated at 1 dB.

Each one of the sub-arrays which do not bridge one another is connected to a different receiver. This receiver is realized according to the so-called "MMIC" technology (Monolithic Microwave Integrated Circuit). The signal delivered by the wave guides belonging to arrays bridging one another must first be amplified, then divided and finally recombined with the signals of the neighboring wave guides in order to reach the required sub-array dimension.

In the described example, there are 51 sub-arrays and the corresponding signals advantageously are transposed by frequency lowering and are digitized into 1 bit signals. These digitized signals at an intermediary frequency are then transmitted to a correlation unit which realizes 1612 real correlations on 1 bit.

As previously indicated, the invention also encompasses the antennas for bidimensional interferometry. In this configuration, the antenna elements advantageously consist of hexagonal radiating apertures. The antenna proper also advantageously is planar like an unidimensional antenna (FIG. 3). It preferably is "Y" shaped with a symmetry center on the axis Z (boresight axis). The branches of the "Y" are 120 degrees apart from one another.

Figure 8:
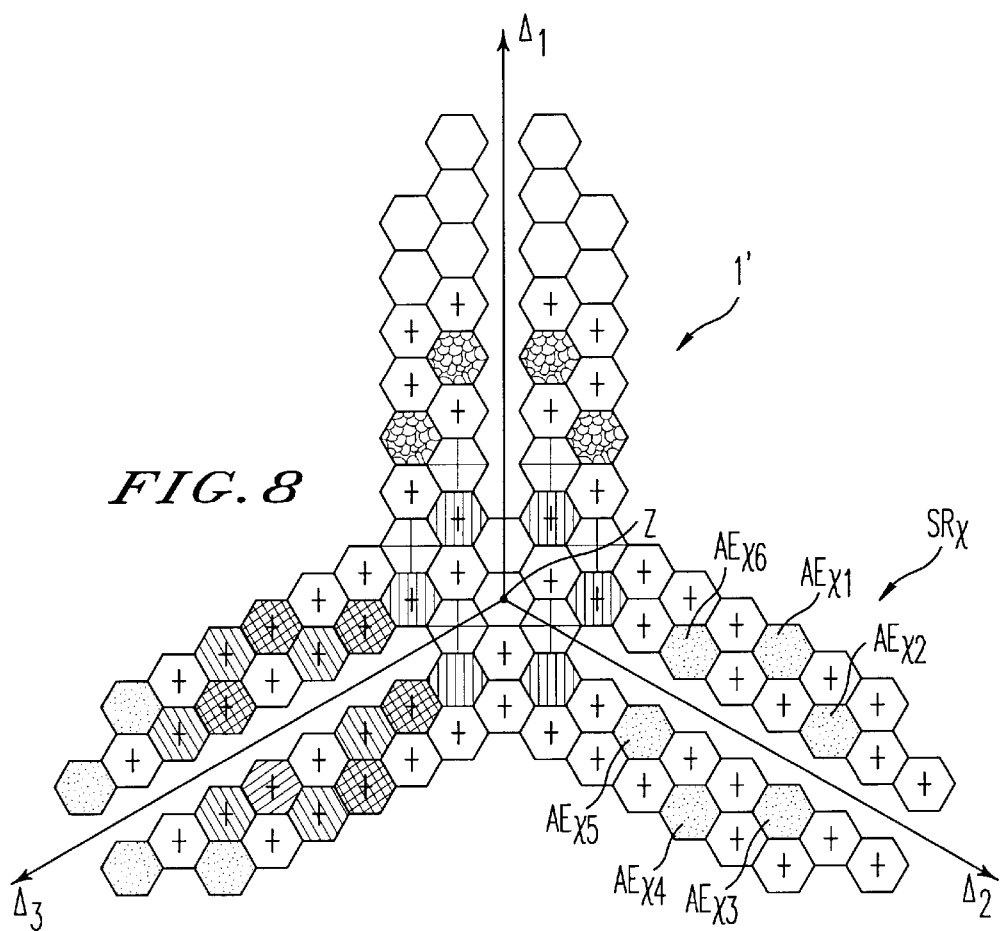
FIG. 8 schematically illustrates an embodiment of a bidimensional interferometric antenna.

FIG. 8 schematically illustrates an example of such an antenna, designated by 1'. The three 120 degrees apart axes are designated by $\Delta_1$ to $\Delta_3$. The antenna elements were represented with various sorts of hatches. The sub-arrays advantageously group antenna elements arranged in an hexagonal configuration. One of these sub-arrays, with an arbitrary index x, is represented and designated by $SR_x$. It includes six antenna elements: $AE_{x1}$–$AE_{x6}$, symmetrically distributed with respect of the axis $\Delta_2$. In this particular configuration example, illustrated in FIG. 8, the central zone along the axis Z is empty, which means it includes no antenna element.

A large number of other configurations also are possible (for instance triangle shaped sub-arrays) with the radiating apertures, i.e. the antenna elements, bridging or not one another.

Figure 9:
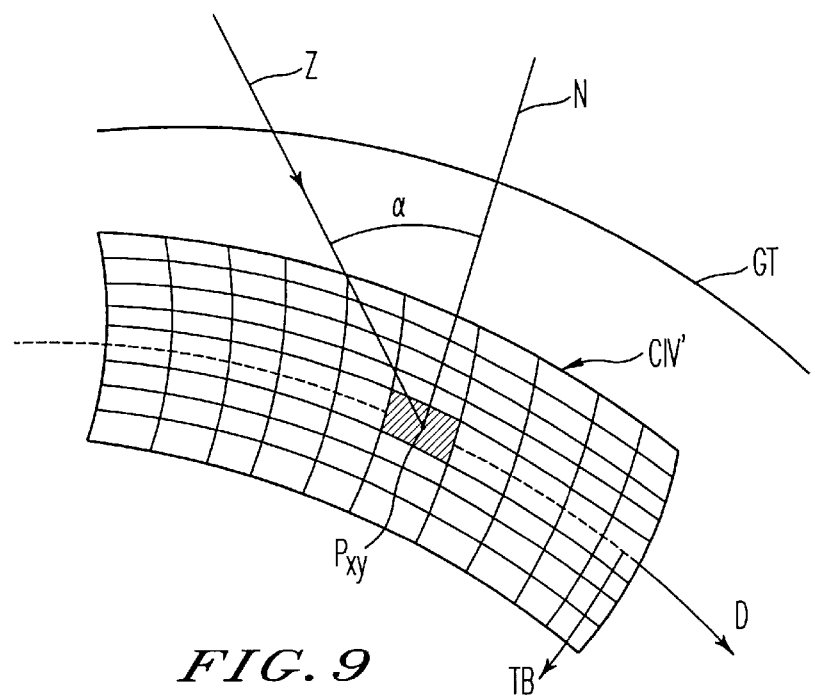
FIG. 9 schematically illustrates the instantaneous field of vision, or IFOV, obtained with such an antenna.

With this type of bidimensional interferometric antennas, an instantaneous field of vision designated here by CVI' consisting of pixels is obtained not only along the direction D, as in the case of the unidimensional interferometric antenna (FIGS. 1a, 1b and 3), but also along the scanning direction TB, as schematically illustrated by the FIG. 9. For instance, the pixel $p_{xy}$ at the impact of the boresight axis Z on the earth globe GT surface has been represented.

Upon reading the above description, it easily is ascertainable that the invention does reach its objects. It however should be clear that the invention is in no way limited to the only embodiment examples explicitly described here, in particular in relation with FIGS. 1 to 8. A number of antenna configurations may in particular be appropriate within the scope of the invention.

What is claimed is:

1. An interferometric hyperfrequency radiometry system comprising:

an antenna supported by a earth-orbiting satellite, which is configured to project an exploration beam of a determined earth surface zone, wherein said antenna subject to a rotation movement around a nadir axis forming a determined angle with a boresight axis so as to obtain a conical scanning around the nadir direction and so that the impact of said beam effects a cycloid movement, the impact of said beam having a symmetry axis coinciding with a track an orbital movement of said satellite on the earth surface, wherein said antenna comprises an interferometric array antenna such that an instantaneous field of vision includes pixels having elementary contiguous zones along at least one axis perpendicular to said conical scanning, and wherein said antenna includes discrete elements connected in sub-arrays.

2. An interferometric hyperfrequency radiometry system as in claim 1, wherein said interferometric antenna is a planar antenna, a plane of the planar antenna being slanted with respect to the nadir direction such that the boresight axis normal to said plane forms said determine angle, said determined angle being equal to half a vertex angle of the scanning cone around the nadir direction.

3. An interferometric hyperfrequency radiometry system as in claim 2, wherein the interferometric antenna comprises a unidimensional antenna having a plurality of elements including radiating apertures uniformly illuminated by a radiant energy in a hyperfrequency wave length range, wherein said plurality of elements are rectangularly shaped and have a mayor side being equal to a size of said antenna along an axis perpendicular to the plane of the planar antenna, and wherein said plurality of elements are distributed along an axis perpendicular to said mayor side.

4. An interferometric hyperfrequency radiometry system as in claim 3, wherein said distribution of the plurality of elements is not uniform so as to reduce a redundancy of the plurality of elements.

5. An interferometric hyperfrequency radiometry system as in claim 3, wherein said antenna is configured as a Hamming window with dimensions 403×206λ, the each of the plurality of elements includes a dimension of 2×206λ, a space sampling factor is 0.5λ, and a filling factor is 0.25, with λ being a wavelength used in the hyperfrequency wavelength range.

6. An interferometric hyperfrequency radiometry system as in claim 5, wherein a rotation speed of said antenna around the nadir direction is 0.6452 rpm.

7. An interferometric hyperfrequency radiometry system as in claim 2, wherein said interferometric antenna comprises a bidimensional antenna having a plurality of elements including radiating apertures uniformly illuminated by a radiant energy in a hyperfrequency wave length range, wherein said plurality of elements are hexagonally shaped and are symmetrically distributed along three axes forming 120 degree angles with one another, so as to present a "Y" configuration, and wherein a symmetry center of the "Y" is located on said boresight axis.

8. An interferometric hyperfrequency radiometry system as in claim 7, wherein said plurality of elements are distributed in hexagonally-shaped sub-arrays.

9. An interferometric hyperfrequency radiometry system as in claim 8, wherein an incident angle of said boresight axis with a normal to the earth surface is 40 degrees.

10. An interferometric hyperfrequency radiometry system as in claim 8, wherein a frequency used is selected as one of the two following frequencies: 36.5 GHZ or 89 GHz.

11. An interferometric hyperfrequency radiometry system as in claim 5 or 6, wherein an incident angle of said boresight axis with a normal to the earth surface is 40 degrees.

12. An interferometric hyperfrequency radiometry system as in claim 5, wherein a frequency used is selected as one of the two following frequencies: 36.5 GHz or 89 GHz.

13. An interferometric hyperfrequency radiometry system as in claim 6, wherein an incident angle of said boresight axis with a normal to the earth surface is 40 degrees.

14. An interferometric hyperfrequency radiometry system as in claim 6, wherein a frequency used is selected as one of the two following frequencies: 36.5 GHz or 89 GHz.

* * * * *

UNITED STATES PATENT AND TRADEMARK OFFICE
CERTIFICATE OF CORRECTION

PATENT NO. : 6,057,799
DATED : May 2, 2000
INVENTOR(S): Manuel MARTIN-NEIRA et al.

It is certified that an error appears in the above-identified patent and that said Letters Patent is hereby corrected as shown below:

On the title page, item [73], the Assignee's name is misspelled. It should be:

--[73] Assignee: Agence Spatiale Europeenne,
Paris, France--

Signed and Sealed this

Seventeenth Day of April, 2001

*Attest:*

NICHOLAS P. GODICI

*Attesting Officer*    *Acting Director of the United States Patent and Trademark Office*